(12) United States Patent
Pienmäki et al.

(10) Patent No.: US 6,705,978 B2
(45) Date of Patent: Mar. 16, 2004

(54) STRUCTURE BETWEEN DRIVING TRANSMISSION AND ROLL

(75) Inventors: Jaana Pienmäki, Muurame (FI); Timo Kukko, Jyskä (FI); Asko Majori, Jyväskylä (FI)

(73) Assignee: Metso Drives Oy, Jyvaskyla (FI)

( * ) Notice: Subject to any disclaimer, the term of this patent is extended or adjusted under 35 U.S.C. 154(b) by 108 days.

(21) Appl. No.: 09/997,106

(22) Filed: Nov. 29, 2001

(65) Prior Publication Data

US 2002/0183179 A1 Dec. 5, 2002

(30) Foreign Application Priority Data

May 31, 2001 (FI) .............................................. 20011138

(51) Int. Cl.$^7$ ................................................. B25F 5/02
(52) U.S. Cl. .............................. 492/11; 492/16; 492/47; 492/15; 29/895.22
(58) Field of Search ................................ 492/15, 16, 7, 492/47, 10, 11; 29/895.22, 895.2; 100/162 B; 384/418; 464/184; 74/421 R, 421 A

(56) References Cited

U.S. PATENT DOCUMENTS

| | | | | |
|---|---|---|---|---|
| 3,766,620 A | * | 10/1973 | Roerig | 492/15 |
| 3,855,681 A | * | 12/1974 | Andriola et al. | 492/15 |
| 4,000,979 A | * | 1/1977 | Biondetti | 492/15 |
| 4,325,170 A | * | 4/1982 | Verboom et al. | 492/7 |
| 4,334,344 A | * | 6/1982 | Biondetti | 492/7 |
| 4,352,228 A | * | 10/1982 | Iso-Aho | 492/15 |
| 4,402,233 A | * | 9/1983 | Toivonen et al. | 492/15 |
| 4,414,890 A | * | 11/1983 | Schiel et al. | 492/15 |
| 4,680,843 A | * | 7/1987 | Junk et al. | 492/15 |
| 4,691,421 A | * | 9/1987 | Schiel | 492/15 |
| 4,891,874 A | * | 1/1990 | Roerig et al. | 492/15 |
| 4,962,577 A | * | 10/1990 | Kubik et al. | 492/15 |
| 5,063,649 A | * | 11/1991 | Wenzel et al. | 492/15 |
| 5,174,002 A | * | 12/1992 | Kusters | 492/15 |
| 5,193,258 A | * | 3/1993 | Brown | 492/7 |
| 5,885,201 A | * | 3/1999 | Brown et al. | 492/7 |
| 6,193,639 B1 | * | 2/2001 | Wenzel | 492/16 |

\* cited by examiner

Primary Examiner—Peter Vo
Assistant Examiner—Marc Jimenez
(74) Attorney, Agent, or Firm—Steinberg & Raskin, P.C.

(57) ABSTRACT

The invention concerns a connecting structure (10) between a driving transmission (11) and a roll (100) driven through it. The driving transmission (11) includes an input shaft (12) in the drive, whereby through the input shaft (12) the drive is transferred to toothed gears and further to the roll jacket (100a) of the driven roll (100) to rotate it. The roll (100) includes a central static shaft (100b) and a bearing (G) to support it. In order to allow axial and radial motions of the roll's (100) roll jacket when the driving transmission (11) is in the fixed position, a seal (25) including a sliding ring (30) is fitted in between the driving transmission (11) and the roll (100).

25 Claims, 4 Drawing Sheets

STRUCTURE BETWEEN DRIVING TRANSMISSION AND ROLL

FIELD OF THE INVENTION

The invention concerns a structure between a driving transmission and a roll.

BACKGROUND OF THE INVENTION

Known in the art is a bellows seal structure between a driving transmission and a variable crown roll. In this application, a variable crown roll means one where the roll jacket can be loaded along its length into the desired shape by using hydraulic pressure or hydraulic loading shoes. The central shaft at which the hydraulic counter-pressure is directed or where the hydraulic loading shoes are located, is a fixed and static shaft. To allow radial and axial motions for the roll jacket of the variable crown roll used in the connection between the driving transmission and the roll, a state-of-the-art solution allows the said motions by using a bellows-like seal structure made of rubber between the driving transmission and the roll. In the known state-of-the-art solution the bellows are fitted in between the end face of a toothed gear surrounding the shaft of the variable crown roll of the driving transmission and a body structure joined to the driven roll after the sleeve shaft of the toothed gear.

The bellows allow large radial motions between the roll structure and the transmission. The rubber bellows are joined by band clamps both with the transmission and with the body part connected to the roll jacket. The transmission oil is located inside the bellows in a space between the bellows and the static central shaft. The rubber bellows are attached by hose clamps between the roll and the toothed gear.

The bellows do not adapt so well to reception of axial motion, radial motion and torsion at high speeds and with big diameters. Should the bellows tear or the clamp break, the resulting leakage will be so big that the entire paper machine must be stopped, so the problem will also come as a surprise, and not as a controlled one.

OBJECTS AND SUMMARY OF THE INVENTION

The present application presents a seal solution of an entirely new type for the driving transmission and roll. The roll may be a variable crown roll in a paper machine, which includes a static, non-rotary central shaft and a joining hydraulically loaded pressure chamber or joining hydraulically loaded loading shoes, which are used or which bring about a pressure in the pressure chamber which is used for loading the roll jacket and for controlling in the roll nips the bending shape of the roll jacket. Through the driving transmission the drive is transferred first from the sleeve shaft through the body part to the roll flange and then to the roll jacket. Bends caused by the hydraulic pressure or by loading applied by the loading shoes are permitted on the central shaft itself. The idle bearing on the drive side of the static shaft is preferably located in connection with the driving transmission.

The sealing between the integrated roll transmission and the roll must receive axial motion, the roll jacket may move a distance equal to clearances between bearings radial motion, eccentricity caused by bending of the roll torsion, a motion caused by backlashes in the gear clutch.

The new seal solution is formed by a sealing ring. The excellency of the structure is based on low friction and on a light-weight sliding ring material, which in addition includes wear-resistant seals in both the axial and radial directions. The sliding ring is located between two lateral sealing rings, whereby the place is determined axially. The sliding ring is dimensioned so that any eccentricity between central lines of the shaft introduced by the transmission and by the loading of the roll will cause no problems for its operation, as the sliding ring may move in its position in the radial direction. A small grease filling is placed in the space remaining inside the sliding ring and the rings to attend to lubrication of seals in the axial direction with the aid of centrifugal force. The seal located on the outer diameter of the sliding ring gets its lubrication from oil inside the transmission. Dimensioning of the seal surface is sufficiently long, so that an axial motion of the jacket will not prevent the operation.

All rings rotate at the rotational speed of the roll. The sliding ring gets into a constant small radial motion, the extent of which depends on the loading of the roll and on the magnitude of the estimated eccentricity. The seal solution is suitable for diameters of all sizes, it is also suitable for both low and high surface velocities. The sliding ring and the seal materials are chosen so that they will withstand well the wear in question. The sealing solution does not aim at an entirely leakage-free solution, but at controlled leakage. From the space outside the sealing a hose/pipe extends in which the leakage can be observed, and wearing of the seals can be foretold so that the suitable time for maintenance can be planned in advance.

The new solution allows sealing of new high-speed machines.

BRIEF DESCRIPTION OF THE FIGURES

In the following, the invention will be described with reference to a preferable embodiment shown in the figures in the appended drawings, but the intention is not to restrict the invention to this embodiment only.

DETAILED DESCRIPTION OF THE INVENTION

Figure 1:
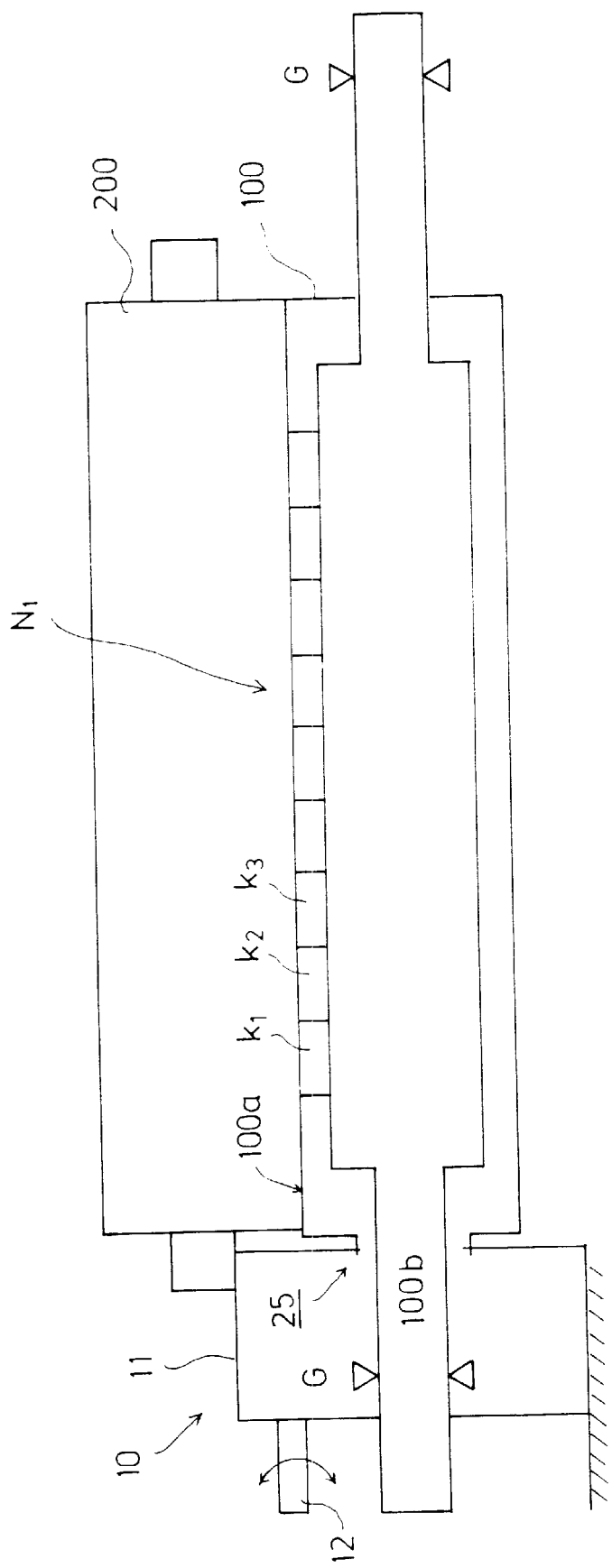
FIG. 1 is an illustrative view of the target area of the invention.

FIG. 1 illustrates the target area of the invention as a connecting structure 10 in between a driving transmission 11 and a roll 100. The drive is supplied e.g. from an electric motor to the input shaft 12 of driving transmission 11, and the drive is transferred further through the driving transmission 11 and toothed gears to the roll jacket 100a of roll 100. Roll 100 includes a non-rotary static central shaft 100b. The central shaft 100b is supported at both ends by idle bearings G, which are preferably ball bearings and which allow the central shaft 100b to bend due to loads. The central shaft 100b of roll 100 includes a pressure chamber or, instead of this, loading shoes as shown in the figure, preferably hydraulic loading shoes $K_1$, $K_2$ . . . , which can be brought into contact with the inner surface of roll jacket 100a and which are used or which bring about a pressure in the pressure chamber which is used for loading the roll jacket in the roll nip $N_1$ between rolls 100 and 200. When the roll jacket is loaded with a hydraulic pressure or by the loading shoes $K_1$, $K_2$, radial transfers will occur between the roll structure and the driving transmission 11 and axial transfers will also occur in the drive. To allow permission of these between the driving transmission 11 and the driven roll 100, the structure according to the invention uses a separate seal 25 according to the invention, which includes a sliding ring 30. The roll 100 may be e.g. a variable crown roll of a paper machine or a board machine, that is, a roll with compensation for bending.

Figure 2A:
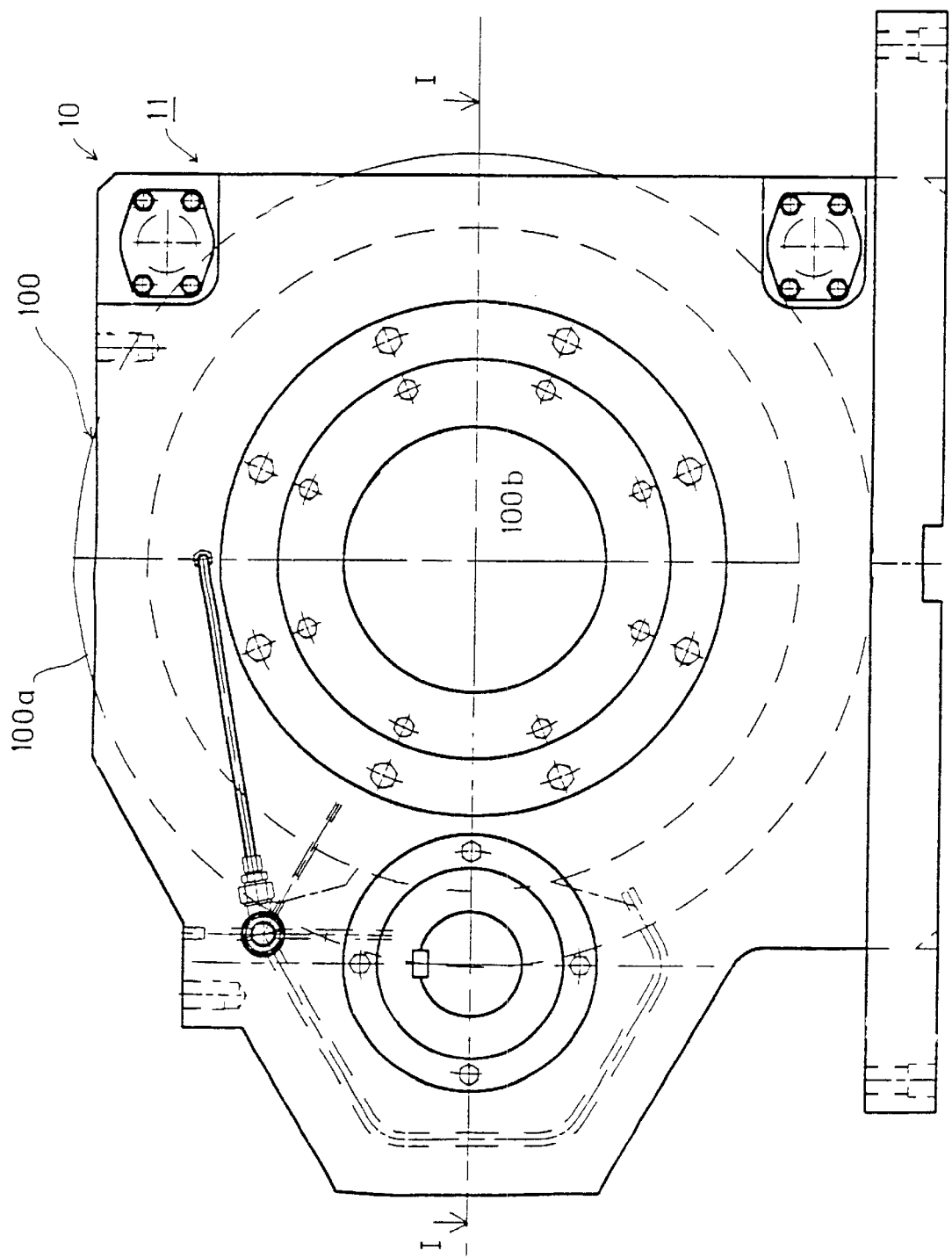
FIG. 2A is an end view of the driving transmission.
Figure 2B:
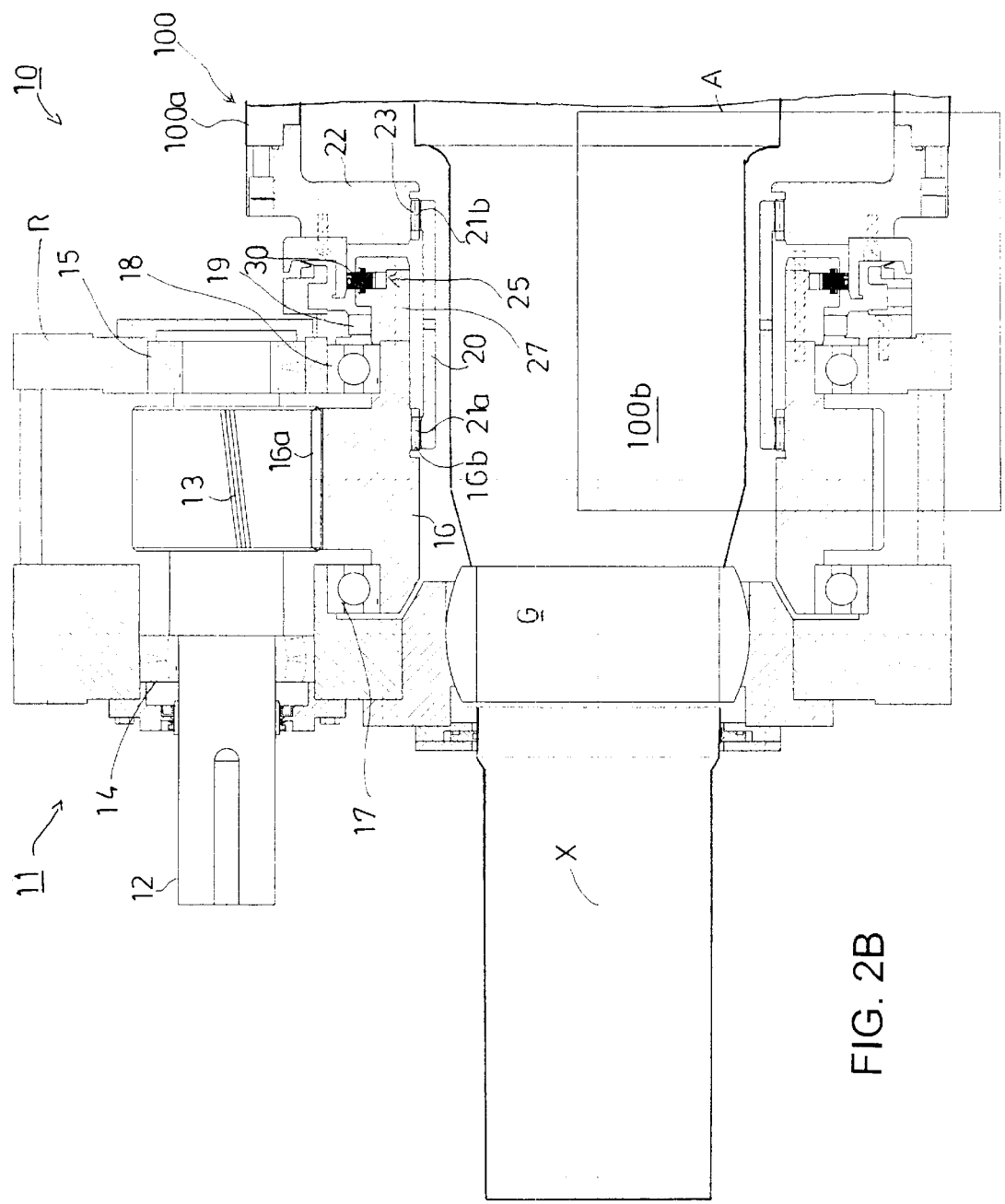
FIG. 2B is a cross-sectional view along line I—I in FIG. 2A.

FIG. 2A is an end view of the driving transmission. FIG. 2B is a cross-sectional view along line I—I in FIG. 2A. Of roll 100 the figure shows the end face on the driving transmission side.

Referring to FIGS. 2A and 2B the following is a description of the connecting structure 10 between driving transmission 11 and the roll 100 driven through the transmission. Roll 100 is preferably a so-called variable crown roll, that is, a roll where bending is compensated for. This means that the roll jacket can be loaded directly by hydraulic pressure or by hydraulic loading shoes $K_1$, $K_2$ The pressure chamber or the loading shoes are located inside the roll jacket between the static or fixed central shaft 100b and the roll jacket 100a. The static shaft 100b is supported on bearing G, which is a so-called idle bearing, which allows angular changes in the static shaft 100b caused by loading. The driving transmission 11 includes a box-section body R. The drive is brought e.g. from an electric motor to input shaft 12. Input shaft 12 includes a toothed gear or teeth 13. The input shaft is supported by bearings 14 and 15 to rotate in boxsection body R. Through teeth 13 the drive is transferred further to a toothed gear 16 surrounding the static shaft 100b through its teeth 16a, which are functionally connected with the teeth 13 of input shaft 11. Toothed gear 16 includes inner teeth 16b. Toothed gear 16 is supported on body R by bearings 17, 18. At one side of bearing 18 there is a cover plate 19 to keep the bearing 18 in place. Bearings 17 and 18 are located at both sides of the circumferential teeth 16a of toothed gear 16. Through the inside teeth 16b of toothed gear 16 the drive is transmitted to sleeve shaft 20 by way of its circumferential teeth 21a. At the other end of sleeve shaft 20 there are outer circumferential teeth 21b, from which the drive is transmitted further by way of teeth 23 of the flange plate 22 to flange plate 22. A ring plate 24 is attached by screws $R_1$ to flange plate 22. The ring plate 24 includes a body part 24a located at right angles against the geometrical central axis X of shaft 100b and a body part 24b in the direction of the geometrical central axis X. Body part 24b includes a first stop face $24c_1$, for a seal 25 according to the invention, for its sliding ring 30 and for a ring seal 31 and a second stop face $24c_2$ for a second seal 26 connected with the leakage oil space 33.

The sliding ring 30 of seal 25 is located in the body 27 of the seal case and it contains a seal cavity 28, preferably an annular groove. In the seal cavity 28 and in grooves $U_1$ and $U_2$ of the seal case body 27 lateral seals $29a_1, 29a_2$ are located, which come against sliding ring 30. The body 27 of the sealing case includes a basic body 27a, a ring plate 27b and a fastening screw $R_2$. Screw $R_2$ is brought through the ring plate 27b and further through basic body 27a and further to the face surface of toothed gear 16. Sliding ring 30 may preferably be of a plastic material. An advantageous rubber O-ring seal 31 is located in the end face of sliding ring 30. The function of seal 31 is to prevent transmission oil from flowing past it and, on the other hand, it allows the formation of a slide surface, so that an axial motion ($L_2$) is allowed between the driving transmission and the roll jacket. Sliding ring 30 is dimensioned so that when it is located in the seal cavity 28, a free space D will form in between the bottom t of seal cavity 28 and face surface n of sliding ring 30, in which free space a lubricant, such as lubricating oil/grease, is placed and which space D allows roll jacket 100a to move in the radial direction. The cavity space D is located in such a way in the structure that it is situated closer to the central axis X of rotation than the first stop face $24c_1$. Hereby the filling grease placed in cavity space D will tend under the influence of the centrifugal force to move towards the seal surfaces, whereby the arrangement attends to the lubrication of the seal surfaces. Motion of the seal's sliding ring 30 under the influence of the centrifugal force towards the bottom t of seal cavity D also moves lubricant from space D on to the surfaces to be lubricated.

The structure according to the invention also includes an outer ring 32, whereby a leakage oil space 33 is formed after the seal 25 between the outer ring and the seal 25. The leakage oil space 33 is connected with a leakage oil channel 34, which is preferably e.g. connected back to the transmission. The leakage oil channel 34 may be formed by a transparent leakage oil pipe, through which the quantity of leakage oil occurring during the operation can be observed. Leakage oil channel 34 may also be provided with a measuring device/sensor that indicates the quantity of leakage oil exactly and which will alarm the machine operator should the said quantity of leakage oil exceed a certain established limit value. If the flow of leakage oil is observed only visually, the by-pass pipe is preferably made of a transparent material or it has a transparent window, through which any flow of leakage oil can be observed.

By bringing the drive to the input shaft in the structure according to the invention, the drive is transmitted further to toothed gear 16 and further to sleeve shaft 20 and through this further to flange plate 22, which is joined further to roll 100 to rotate the roll jacket 100a of the variable crown roll. In this way rotation is achieved for toothed gear 16, whereby the rotational speed as regards the said toothed gear 16 and the associated seal 25 is the same as for the driven roll 100 and its roll jacket 100a.

Figure 3:
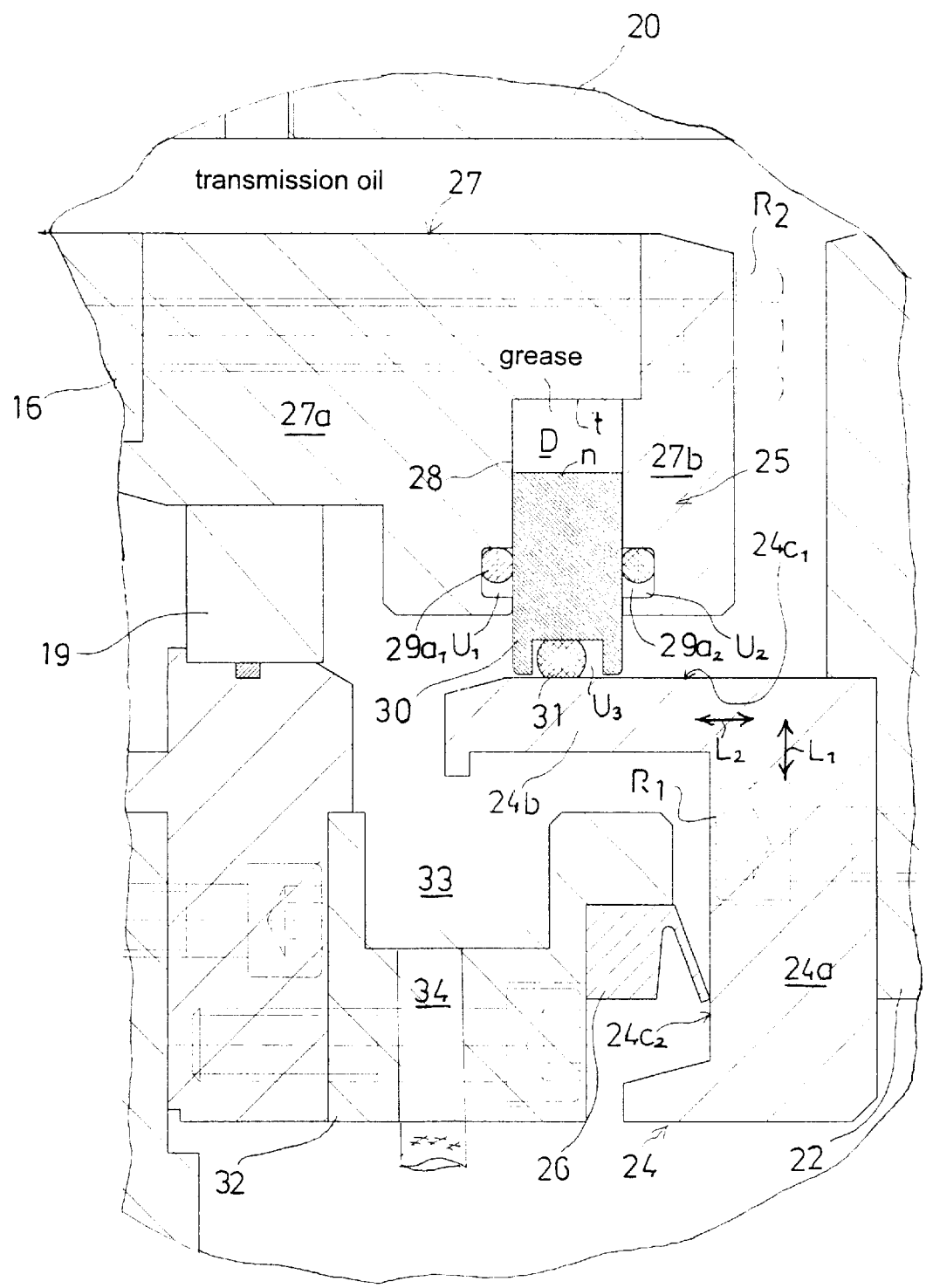
FIG. 3 shows the seal on a larger scale at area A in FIG. 2B.

FIG. 3 shows seal 25 on a larger scale in the target area of the invention. Seal 25 is formed by the following structure. Seal 25 is an annular structure around central shaft 100b. Seal 25 includes an annular sliding ring 30, which is located in the seal cavity 28 of seal case 27. Annular lateral seals $29a_1$ and $29a_2$ are also located in grooves $U_1$ and $U_2$ of the seal case 27 of seal cavity 28. An O-ring seal 31 is located in a peripheral grove $U_3$ in the end face of sliding ring 30. In the structure according to the invention, a free space D is formed, into which lubricant/grease is placed so that when the seal case body 27 rotates together with the other structure, the centrifugal force will cause the lubricant/grease to move in a radial direction outwards, and in this way the side surfaces of both the lateral seals $29a_1, 29a_2$ and of the sliding ring 30 will be lubricated. The transmission oil proper performs lubrication of O-ring seal 31 when it is located against its stop face $24c_1$. Stop face $24c_1$ is made so long that O-ring seal 31 may slide along it due to axial motions ($L_2$) of the roll jacket. The axial motion (arrow $L_2$) and the radial motion (arrow $L_1$) of the roll's 100 jacket 100a are passed on by way of flange plate 22 to ring plate 24 and thus to body part 24b. Ring plate 30 receives the radial motion, and the axial motion is taken into account by making stop face $24c_1$ long enough, whereby O-ring 31 will travel along stop face $24c_1$. In operation, sliding ring 30 and the seal 31 located in its end face will rotate. Seal 31 prevents transmission oil from flowing past it. Seals $29a_1$ and $29a_2$ prevent transmission oil from flowing into space D.

The sliding ring seal 30 is preferably made of a plastic material and it is wear resistant, it tolerates heat well and it is also oil resistant and has good sliding qualities.

We claim:

1. An arrangement in a paper machine, comprising:
a roll having a roll shaft and a roll jacket;
a driving transmission arranged to drive said roll and including an input shaft coupled to said roll jacket such that rotation of said input shaft causes rotation of said roll jacket; and
a connecting structure arranged to connect said driving transmission to said roll jacket such that said roll jacket is axially and radially movable when said driving transmission is in a fixed position, said connecting structure comprising
a seal arranged between said driving transmission and said roll, said seal including
a seal case defining a seal cavity and rotatably coupled to said input shaft, and
a sliding ring arranged in said seal cavity of said seal case to define a free space between said sliding ring and a bottom of said seal cavity, said sliding ring being slidable in a radial direction in said seal cavity; and
a seal part connected to said roll jacket, said seal part defining a stop face for limiting radial movement of said sliding ring in the radial direction away from the bottom of said seal cavity.

2. The arrangement of claim 1, wherein said connecting structure further comprises:
a central toothed gear having a first set of teeth in toothed engagement with said input shaft and a second set of teeth; and
a sleeve shaft having a first set of teeth in toothed engagement with said second set of teeth of said central toothed gear.

3. The arrangement of claim 2, wherein said sleeve shaft has a second set of teeth, said connecting structure further comprising a flange plate connected to said roll jacket and arranged in toothed engagement with said second set of teeth of said sleeve shaft.

4. The arrangement of claim 2, wherein said seal case is arranged in an end face of said central toothed gear.

5. The arrangement of claim 1, wherein said seal cavity is an annular groove defined in said seal case.

6. The arrangement of claim 1, wherein said seal case includes side surfaces defining said seal cavity, said sliding ring being arranged between said side surfaces, each of said side surfaces including a groove, the connecting structure further comprising a lateral seal arranged in said groove in each of said side surfaces and in contact with said sliding ring.

7. The arrangement of claim 6, wherein said sliding ring slides in said seal cavity to vary a size of said free space between said sliding ring and the bottom of said cavity, further comprising lubricant/grease arranged in said free space between said sliding ring and the bottom of said seal cavity, whereby when said seal case rotates, the lubricant/grease in said free space moves with the aid of centrifugal force toward said sliding ring and said lateral seals in order to provide lubrication between said sliding ring and said side surfaces of said seal case.

8. The arrangement of claim 1, further comprising lubricant/grease arranged in said free space between said sliding ring and the bottom of said seal cavity, whereby when said seal case rotates, the lubricant/grease in said free space moves with the aid of centrifugal force toward said sliding ring.

9. The arrangement of claim 1, wherein said sliding ring includes a peripheral groove in an end face oriented toward said seal part, the connecting structure further comprising a seal arranged against said stop face of said seal part and a flange plate connected to said seal part and to said roll jacket.

10. The arrangement of claim 1, wherein said seal part is a ring plate including a first body part oriented perpendicular to a central axis of said roll shaft and a second body part oriented in a direction of the central axis, said stop face being formed in said second body part and having an elongated dimension in the axial direction of the central axis to enable axial motion of said roll jacket.

11. The arrangement of claim 1, wherein said sliding ring is annular and said sliding ring and said stop face are arranged to enable both radial and axial motion of said roll jacket.

12. The arrangement of claim 1, wherein said connecting structure defines a leakage oil space arranged to receive fluid leaking from said seal and a leakage oil channel in communication with said leakage oil space, whereby existence of a leakage oil flow through said leakage oil channel is ascertainable.

13. The arrangement of claim 1, wherein said sliding ring is made of a plastic material.

14. A connecting structure for connecting a roll and a driving transmission which drives the roll, the driving transmission including an input shaft and the roll having a roll shaft and a roll jacket coupled to the input shaft such that rotation of the input shaft causes rotation of the roll jacket around the roll shaft, the connecting structure being arranged to enable axial and radial movement of the roll jacket when the driving transmission is in a fixed position, the connecting structure comprising:
a seal adapted to be arranged between the driving transmission and the roll, said seal including
a seal case defining a seal cavity and being adapted to be rotatably coupled to the input shaft, and
a sliding ring arranged in said seal cavity of said seal case to define a free space between said sliding ring and a bottom of said seal cavity, said sliding ring being slidable in a radial direction in said seal cavity; and
a seal part adapted to be rotatably connected to the roll jacket, said seal part defining a stop face for limiting radial movement of said sliding ring in the radial direction away from the bottom of said seal cavity.

15. The connecting structure of claim 14, further comprising:
a central toothed gear having a first set of teeth adapted to be in toothed engagement with the input shaft and a second set of teeth; and
a sleeve shaft having a first set of teeth in toothed engagement with said second set of teeth of said central toothed gear.

16. The connecting structure of claim 15, wherein said sleeve shaft has a second set of teeth, further comprising a flange plate adapted to be connected to the roll jacket and arranged in toothed engagement with said second set of teeth of said sleeve shaft.

17. The connecting structure of claim 15, wherein said seal case is arranged in an end face of said central toothed gear.

18. The connecting structure of claim 15, wherein said seal cavity is an annular groove defined in said seal case and said sliding ring is annular.

19. The connecting structure of claim 15, wherein said seal case includes side surfaces defining said seal cavity, said sliding ring being arranged between said side surfaces, each of said side surfaces including a groove, the connecting structure further comprising a lateral seal arranged in said groove in each of said side surfaces and in contact with said sliding ring.

20. The connecting structure of claim 19, further comprising lubricant/grease arranged in said free space between said sliding ring and the bottom of said seal cavity, whereby when said seal case rotates, the lubricant/grease in said free space moves with the aid of centrifugal force toward said sliding ring and said lateral seals in order to provide lubrication between said sliding ring and said side surfaces of said seal case.

21. The connecting structure of claim 15, wherein said sliding ring includes a peripheral groove in an end face oriented toward said seal part, further comprising a seal arranged against said stop face of said seal part and a flange plate connected to said seal part and adapted to be connected to the roll jacket.

22. The connecting structure of claim 15, wherein said seal part is a ring plate including a first body part adapted to be oriented perpendicular to a central axis of the roll shaft and a second body part adapted to be oriented in a direction of the central axis, said stop face being formed in said second body part and having an elongated dimension in the axial direction of the central axis to enable axial motion of the roll jacket.

23. The connecting structure of claim 15, wherein said sliding ring is annular and said sliding ring and said stop face are arranged to enable both radial and axial motion of the roll jacket.

24. The connecting structure of claim 15, wherein a leakage oil space is arranged to receive fluid leaking from said seal and a leakage oil channel in communication with said leakage oil space, whereby existence of a leakage oil flow through said leakage oil channel is ascertainable.

25. The connecting structure of claim 15, wherein said sliding ring slides in said seal cavity to vary a size of said free space between said sliding ring and the bottom of said cavity.

* * * * *